United States Patent [19]
Epperson

[11] Patent Number: 6,035,257
[45] Date of Patent: Mar. 7, 2000

[54] METHOD AND APPARATUS FOR REDUCING HARMONIC DISTORTION

[75] Inventor: Leonard D. Epperson, Ponca City, Okla.

[73] Assignee: Pelton Company, Ponca City, Okla.

[21] Appl. No.: 08/988,143

[22] Filed: Dec. 10, 1997

[51] Int. Cl.[7] .................................................. G06F 19/00
[52] U.S. Cl. ............................................................ 702/17
[58] Field of Search ........................ 702/14, 17; 367/190

[56] References Cited

U.S. PATENT DOCUMENTS

| | | | |
|---|---|---|---|
| 3,283,260 | 11/1966 | Vaughan | 331/2 |
| 3,600,699 | 8/1971 | Orenberg | 331/2 |
| 3,895,343 | 7/1975 | Farr | 367/190 |
| 4,068,210 | 1/1978 | Corkhill | 340/17 |
| 4,184,144 | 1/1980 | Rickenbacker | 367/137 |
| 4,186,281 | 1/1980 | Kasuga et al. | 179/100.4 |
| 4,227,158 | 10/1980 | Schroeder et al. | 331/2 |
| 4,612,517 | 9/1986 | Wagner | 331/46 |
| 4,616,352 | 10/1986 | Sallas et al. | 367/190 |
| 4,654,836 | 3/1987 | Wason | 367/190 |
| 4,670,863 | 6/1987 | Sallas et al. | 367/190 |
| 4,751,687 | 6/1988 | Christensen | 367/22 |
| 4,782,446 | 11/1988 | Ehler et al. | 702/14 |
| 4,823,326 | 4/1989 | Ward | 367/41 |
| 5,128,633 | 7/1992 | Martin et al. | 331/2 |
| 5,347,494 | 9/1994 | Andersen | 367/42 |
| 5,410,517 | 4/1995 | Andersen | 367/75 |
| 5,610,558 | 3/1997 | Mittel et al. | 331/2 |
| 5,719,821 | 2/1998 | Sallas et al. | 367/41 |

Primary Examiner—Donald E. McElheny, Jr.
Attorney, Agent, or Firm—Dunlap, Codding & Rogers, P.C.

[57] ABSTRACT

The present invention relates to a control system for a vibrator system capable of generating and applying a reciprocating force to an object, such as the underlying ground or water. The control system is generally provided with a means for outputting a drive signal having a fundamental frequency to the vibrator system to activate the reciprocating of the base plate of the vibrating system and a means for receiving a vibrator output signal indicative of the force applied to the object. The vibrator output signal includes at least one harmonic frequency signal and is delayed with respect to the phase of the initial drive signal. To increase the signal-to-noise ratio of the vibrator system, the control system includes a harmonic distortion reduction means receiving the vibrator output signal for outputting at least one harmonic drive signal to the vibrator system. The harmonic drive signal has a proper phase, amplitude, polarity, and frequency which are adjusted to minimize at least one of the harmonic frequency signals being produced by the vibrator system.

8 Claims, 6 Drawing Sheets

METHOD AND APPARATUS FOR REDUCING HARMONIC DISTORTION

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention relates generally to methods and apparatus for reducing harmonic distortion, and more particularly but not by way of limitation, to a harmonic distortion reduction system for providing at least a portion of a drive signal to a vibrator system adapted to impart energy into an object such as the earth wherein the portion of the drive signal provided by the harmonic distortion reduction system minimizes the harmonic distortion being generated from the vibrator system.

2. Brief Description of the Related Art

Vibrator systems such as servo-hydraulic vibrator systems impart energy waves into the earth at frequencies and magnitudes dictated by control electronics. The energy waves imparted into the earth by the vibrator system are used to determine the nature, orientation and location of subsurface formations. Generally, the energy waves created by the vibrator system travel through the earth's crust and are reflected back to the surface by various subsurface formations. These reflected energy waves are detected by means of seismic receivers.

Many sources of noise exist during data acquisition and it is therefore important to achieve the highest signal-to-noise ratio possible to enhance the detection of subsurface formations. For example, the vibrator system outputs not only energy waves of desired fundamental frequencies, but also of undesirable harmonic frequencies. These energy waves of undesirable harmonic frequencies are reflected onto the seismic records as noise. Merely increasing the energy output from the vibrator system to increase the energy waves of desired fundamental frequencies also increases the undesirable harmonic energy as well. Thus, increasing the energy output from the vibrator decreases the signal-to-noise ratio and increases the problems associated with harmonic energy. Existing control systems monitor the harmonic distortion level and reduce the vibrator output until the distortion level is below a predetermined threshold.

If one were to eliminate the noise associated with the undesirable harmonic frequencies, the energy output from the vibrator system could be increased which would improve the signal-to-noise ratio of the vibrator system. This would permit greater resolution in the seismic records which would thereby enhance the detection of subsurface formations, such as natural gas pockets. It is to such an improved control system having a harmonic distortion reduction system for providing at least a portion of a drive signal to the vibrator system to which the present invention is directed.

BRIEF SUMMARY OF THE INVENTION

The present invention relates to a control system for a vibrator system capable of generating and applying a reciprocating force to an object. The vibrator system may include a base plate contacting the object and a reaction mass connected to the base plate via a piston when the vibrator system is utilized to apply a reciprocating force to the ground, for example, or, the vibrator system may include a marine transducer when the vibrator system is used for marine vibroseis.

The control system is generally provided with a means for outputting a drive signal having a fundamental frequency to the vibrator system to activate the reciprocating force applied to the object and a means for receiving a vibrator output signal indicative of the force applied to the object by the vibrator system. The vibrator output signal includes at least a fundamental frequency signal and a plurality of harmonic frequency signals and is delayed with respect to the phase of the initial drive signal. The harmonic frequency signals included in the vibrator output signal are undesirable and generally decrease the signal to noise ratio of the vibrator system.

To increase the signal-to-noise ratio of the vibrator system, the control system includes a harmonic distortion reduction means for receiving the vibrator output signal and for outputting at least one harmonic drive signal to the vibrator system. The harmonic drive signal has a proper phase, amplitude, polarity, and frequency which are adjusted to minimize at least one of the harmonic frequency signals being produced by the vibrator system.

To eliminate or minimize more than one harmonic frequency as more than one harmonic frequency is typically present in the vibrator output signal, the harmonic distortion reduction means can include a plurality of harmonic reduction control blocks. Each harmonic reduction control block is adapted to output a signal to the vibrator system of a proper phase, amplitude, and polarity to minimize or greatly reduce only one of the harmonic frequency signals being produced by the vibrator system.

Thus, the control systems constructed in accordance with the present invention permit the energy output from the vibrator system to be increased and thereby enhance the detection of subsurface formations, such as natural gas pockets. Other objects, features and advantages of the present invention will become apparent to those of ordinary skill in the art upon a review of the present specification, the attached drawings and the appended claims.

DETAILED DESCRIPTION OF THE INVENTION

Figure 1:
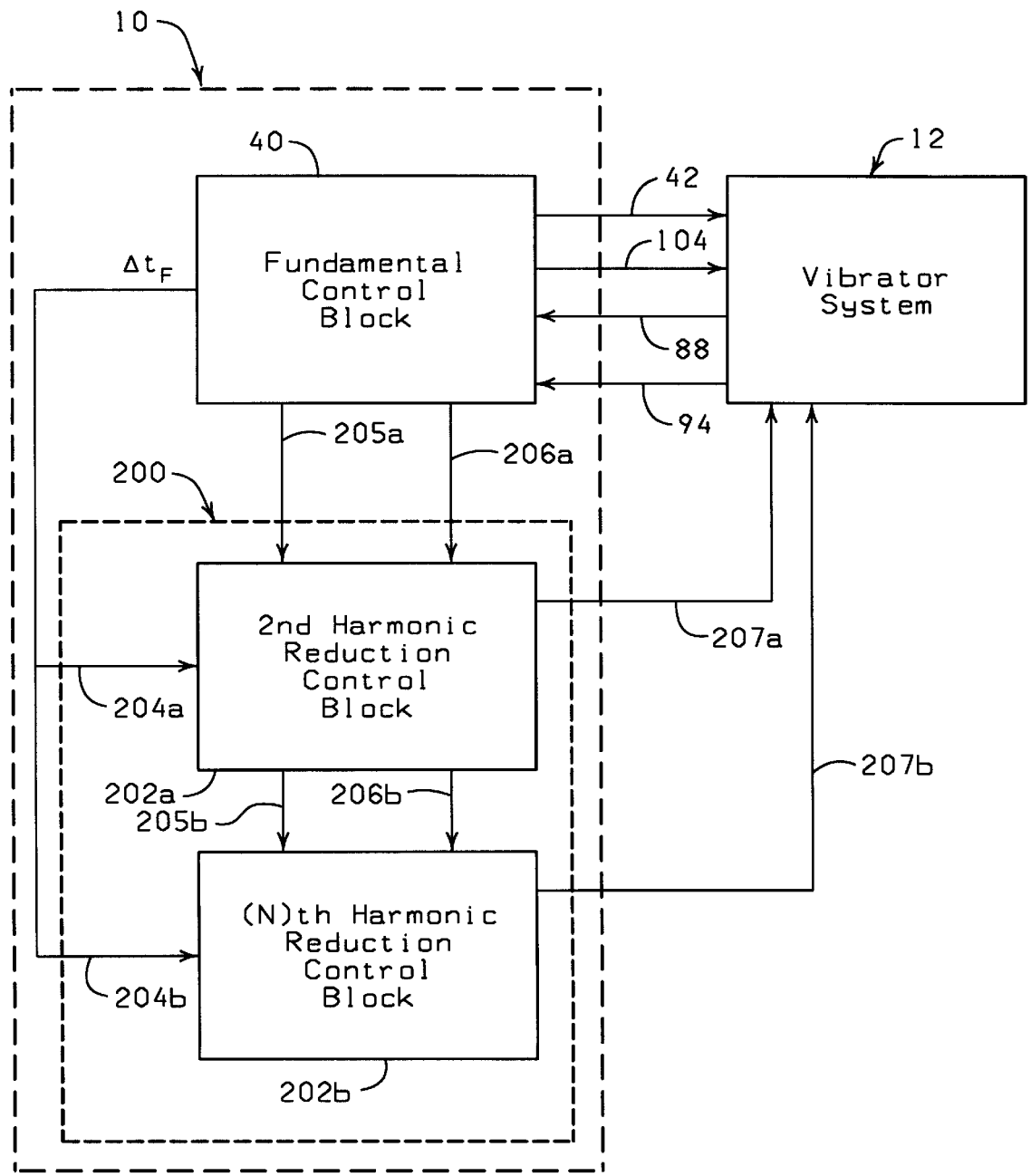
FIG. 1 is a schematic, diagrammatic view of a control system constructed in accordance with the present invention for controlling a vibrator system.

Referring now to the drawings and in particular to FIG. 1, shown therein and designated by the reference numeral 10 is a control system constructed in accordance with the present invention for controlling a vibrator system 12 adapted to impart energy waves into an object 14 (FIG. 6) such that noise associated with undesirable harmonic frequencies in the energy waves is minimized or eliminated.

Figure 6:
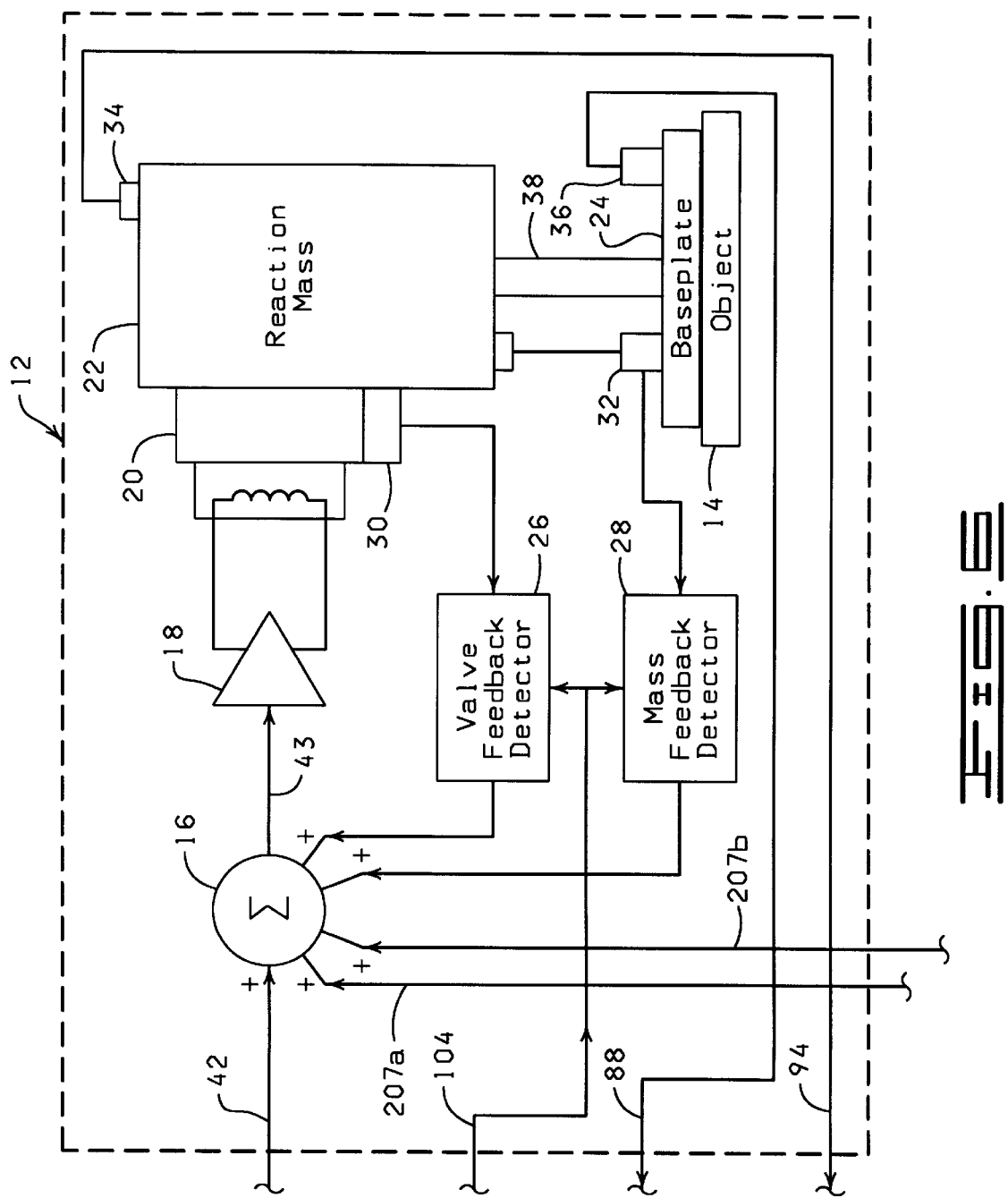
FIG. 6 is a schematic, diagrammatic view of the vibrator system controlled by the control system depicted in FIG. 1.

The vibrator system 12 is shown in more detail in FIG. 6. The vibrator system 12 can be a conventional servo-hydraulic vibrator system including a summing amplifier 16, a power amplifier 18, a servo-valve 20, a reaction mass 22, a base plate 24, a valve feedback detector 26, a mass feedback detector 28, a first LVDT 30, a second LVDT 32, a first accelerometer 34, a second accelerometer 36, and a piston shaft 38.

The base plate 24 of the vibrator system 12 is positioned on the object 14 which can be the crust of the earth. The base plate 24 is reciprocated via the piston shaft 38 to impart energy waves from the vibrator system 12 into the object 14. The energy waves travel through the earth's crust and are reflected back to the earth's surface by various subsurface formations when the object 14 is the earth. The reflected energy waves are detected by means of seismic receivers (not shown) which provide data indicative of the subsurface formations of the earth generally below and near the vibrator system 12.

As shown in FIG. 1 in combination with FIG. 6, the summing amplifier 16 of the vibrator system 12 receives a drive signal from a fundamental control block 40 of the control system 10 via a signal path 42. In response to receiving the drive signal, the vibrator system 12 reciprocates the base plate 24 in a manner well known in the art. The drive signal is typically sinusoidal in shape and varies either linearly or non-linearly in frequency over a sweep of frequencies generally encompassing more than two octaves. Sweeps of different frequencies and different ranges of frequencies are provided to the vibrator system 12 to optimize data. The control system 10 can be programmed to attempt such different sweeps until an optimum range is determined.

Figure 2:
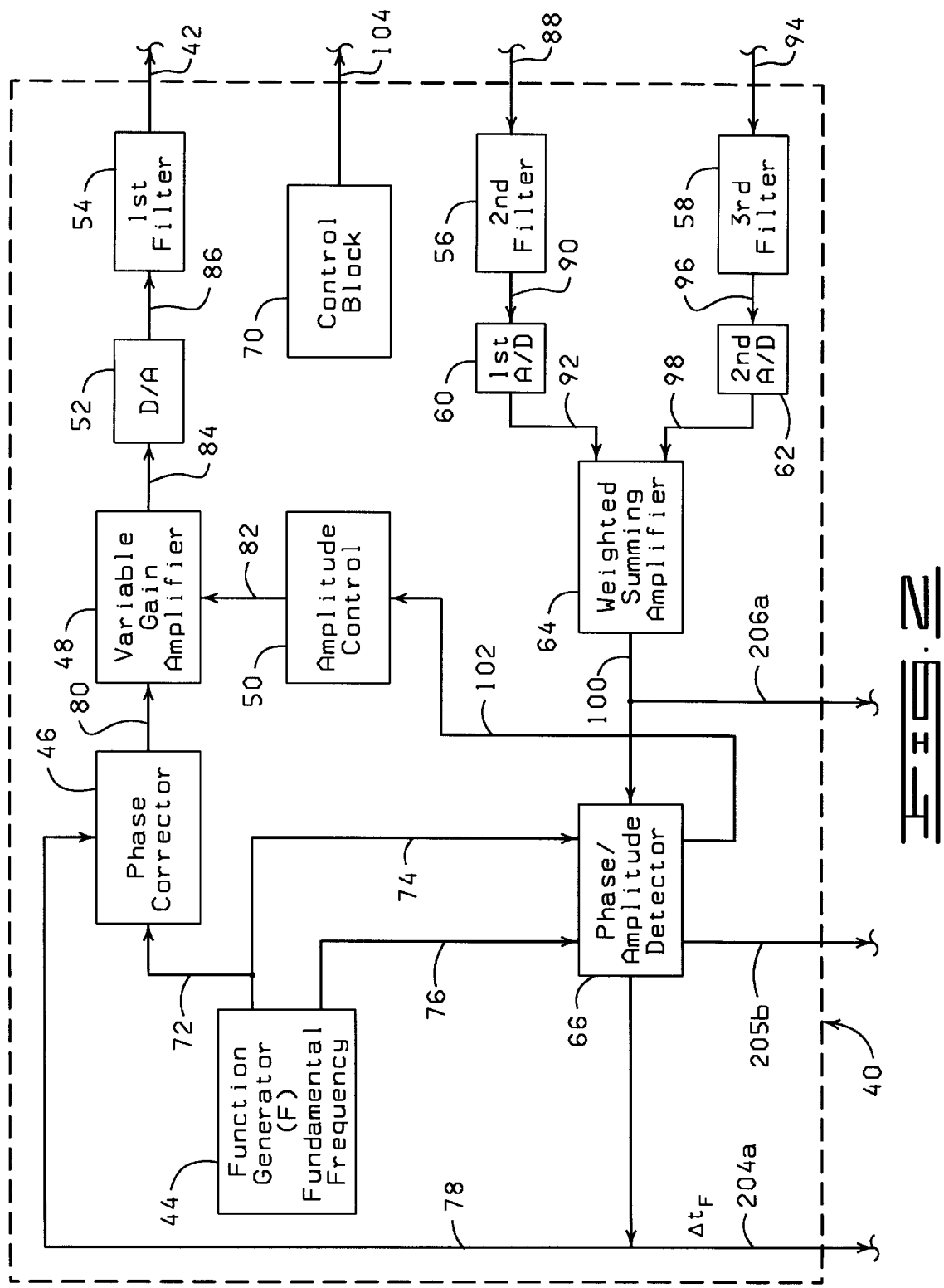
FIG. 2 is a schematic, diagrammatic view of a fundamental control block of the control system depicted in FIG. 1.

The fundamental control block 40 of the control system 10 is shown in detail in FIG. 2. The fundamental control block 40 is provided with a function generator 44, a phase corrector 46, a variable gain amplifier 48, an amplitude control 50, a digital-to-analog converter 52, a first filter 54, a second filter 56, a third filter 58, a first analog-to-digital converter 60, a second analog-to-digital converter 62, a weighted summing amplifier 64, a phase/amplitude detector 66, and a control block 70.

In operation, the function generator 44 of the fundamental control block 40 generates a first pilot reference signal ($A_1 SIN(\omega_1\tau)$) and a second pilot reference signal ($A_1 COS(\omega_1\tau)$). The first pilot reference signal and the second pilot reference signal have the same fundamental frequency, but are phase shifted 90 degrees apart. The fundamental frequency of the first and second pilot reference signals is the frequency at which it is desired to reciprocate the base plate 24 of the vibrator system 12 so as to impart the energy waves into the object 14.

The first pilot reference signal is input to the phase corrector 46 and the phase/amplitude detector 66 via the signal paths 72 and 74, respectively. The second pilot reference signal is input into the phase/amplitude detector 66 via a signal path 76. The phase corrector 46 receives a fundamental frequency time shift error signal via a signal path 78. The fundamental frequency time shift error signal is depicted in FIG. 2 as $\Delta t_F$. The phase corrector 46 changes the phase of the first pilot reference signal by an amount determined by the fundamental frequency time shift error signal. Because the fundamental frequency time shift error is determined by a vibrator output signal received by the fundamental control block 40 after the base plate 24 begins to reciprocate, initially the fundamental frequency time shift error signal is set to a value determined from the previous sweep. Thus, initially, the phase corrector 46 outputs a phase shifted pilot signal over a signal path 80 which is time shifted (advanced) with respect to the first pilot reference signal received by the phase corrector 46.

The variable gain amplifier 48 receives the phase shifted pilot signal from the phase corrector 46 via the signal path 80, and an amplitude control signal from the amplitude control 50 via a signal path 82. The phase shifted pilot signal is amplified or attenuated by the variable gain amplifier 48 based on the amplitude control signal to form an amplitude adjusted phase shifted pilot signal. Typically, the amplitude control signal is set to an initial value determined by the hold down weight of the vibrator system 12 so that the amplitude of the amplitude adjusted phase shifted pilot signal output by the variable gain amplifier 48 will not cause the vibrator system 12 to exceed the hold down force. Subsequently, the amplitude control signal will be adjusted by the amplitude control 50 at the end of each cycle of the first pilot reference signal during each sweep thereof based on the feedback (vibrator output signal) received by the fundamental control block 40 as will be described hereinafter.

The amplitude adjusted phase shifted pilot signal is output by the variable gain amplifier 48 and input to the digital-to-analog converter 52 via a signal path 84 to convert such signal into an analog signal for driving the vibrator system 12. The analog signal is then output to the first filter 54 via a signal path 86. The first filter 54 receives the analog signal output by the digital-to-analog converter 52 and filters such signal to take the sampling frequency off. The first filter 54 then outputs a fundamental drive signal having the fundamental frequency to the summing amplifier 16 of the vibrator system 12 via the signal path 42. Upon receiving the fundamental drive signal, the summing amplifier 16 sums each of the summing amplifier inputs, substantially as shown in FIG. 6 and then outputs such summed signals to the power amplifier 18 via the signal path 43 to begin the reciprocating of the base plate 24 in a manner well known in the art.

It should be noted that the digital to analog converter 52 and the first filter 54 are only necessary when the amplitude adjusted phase shifted pilot signal is in a digital format. Thus, if the amplitude adjusted phase shifted pilot signal is provided in an analog format, the digital to analog converter 52 and the first filter 54 can be eliminated.

During operation of the vibrator system 12, the vibrator system 12 generates two forces; the reaction mass 22, and the base plate 24. These forces will be referred to herein respectively as $F_M$ and $F_B$. Designating $A_M$ and $A_B$ as the respective accelerations of the reaction mass 22 and the base plate 24, and $M_B$ as the mass of the base plate 24 (including the piston shaft, and any mass moving therewith), and $M_M$ as the mass of the reaction mass 22, the force equations may be written: $-F_O = M_B \times A_B + M_M \times A_M$ where $F_O$ is the force imparted to the object 14.

The force imparted to the object 14, therefore, can be determined by generating signals proportional to base plate acceleration and reaction mass acceleration, multiplying these two signals by a factor equivalent to the respective masses of the base plate 24 and the reaction mass 22, and combining the two resulting signals.

The second filter 56 of the fundamental control block 40 of the control system 10 is connected to the second accelerometer 36 (FIG. 6) disposed on the base plate 24 of the vibrator system 12 via a signal path 88. The second accelerometer 36 outputs signals to the second filter 56 indicative of the acceleration of the base plate 24 and thus, the force of the base plate 24. The second filter 56 is typically a low-pass filter having a 400 Hz cutoff frequency. The second filter 56 also removes any DC bias from the signal received thereby. Thus, the second filter 56 outputs a signal over a signal path 90 (FIG. 2) to the first analog-to-digital converter 60 which has no DC bias and which does not exceed about 400 Hz. The first analog-to-digital converter 60 receives the signal output by the second filter 56 and converts such signal to a digital signal. The first analog-to-digital converter 60 then outputs the digital signal to the weighted summing amplifier 64 via a signal path 92.

The first accelerometer 34 (FIG. 6) of the vibrator system 12 is disposed on the reaction mass 22 and outputs signals indicative of the acceleration of the reaction mass 22 and thus, the reaction mass force sensed thereby. The reaction mass acceleration signal output by the first accelerometer 34 is input into the third filter 58 via a signal path 94. The third filter 58 is substantially identical in construction and function as the second filter 56. Thus, the third filter 58 outputs an analog signal to the second analog-to-digital converter 62 via a signal path 96 having no DC bias and not exceeding about 400 Hz. The second analog-to-digital converter 62 converts the analog signal into a digital signal and outputs the digital signal to the weighted summing amplifier 64 via a signal path 98.

The weighted summing amplifier 64 weights the signals produced by the first and second accelerometers 34 and 36 by the weight of the reaction mass 22 and the base plate 24, respectively. For example, if the reaction mass 22 weighs 9000 pounds and the base plate 24 weighs 3000 pounds, the signal produced by the first accelerometer 34 will be weighted three times the signal produced by the second accelerometer 36. The weighted summing amplifier 64 outputs a vibrator output signal to the phase/amplitude detector 66 via a signal path 100. The vibrator ground force output signal is the vector sum of the forces produced by the reaction mass 22 and the base plate 24 as sensed by the first accelerometer 34 and the second accelerometer 36, respectively. Assuming that the first pilot reference signal is a sine wave $A_1 \sin \omega_1 t$, then the vibrator output signal will contain an attenuated, phase-shifted sine-wave of the same frequency $B_1 \sin(\omega_1 \tau + \beta_1)$. The vibrator output signal will also contain harmonies $B_n \sin(n\omega_1 t + \beta_n)$.

It should be noted that the weighted summing amplifier 64 can be replaced by simply an amplifier which receives a signal from solely one of the first accelerometer 34 and the second accelerometer 36. In other words, the vibrator output signal can be generated by signals received from the reaction mass 22, the base plate 24, and combinations thereof.

Figure 3:
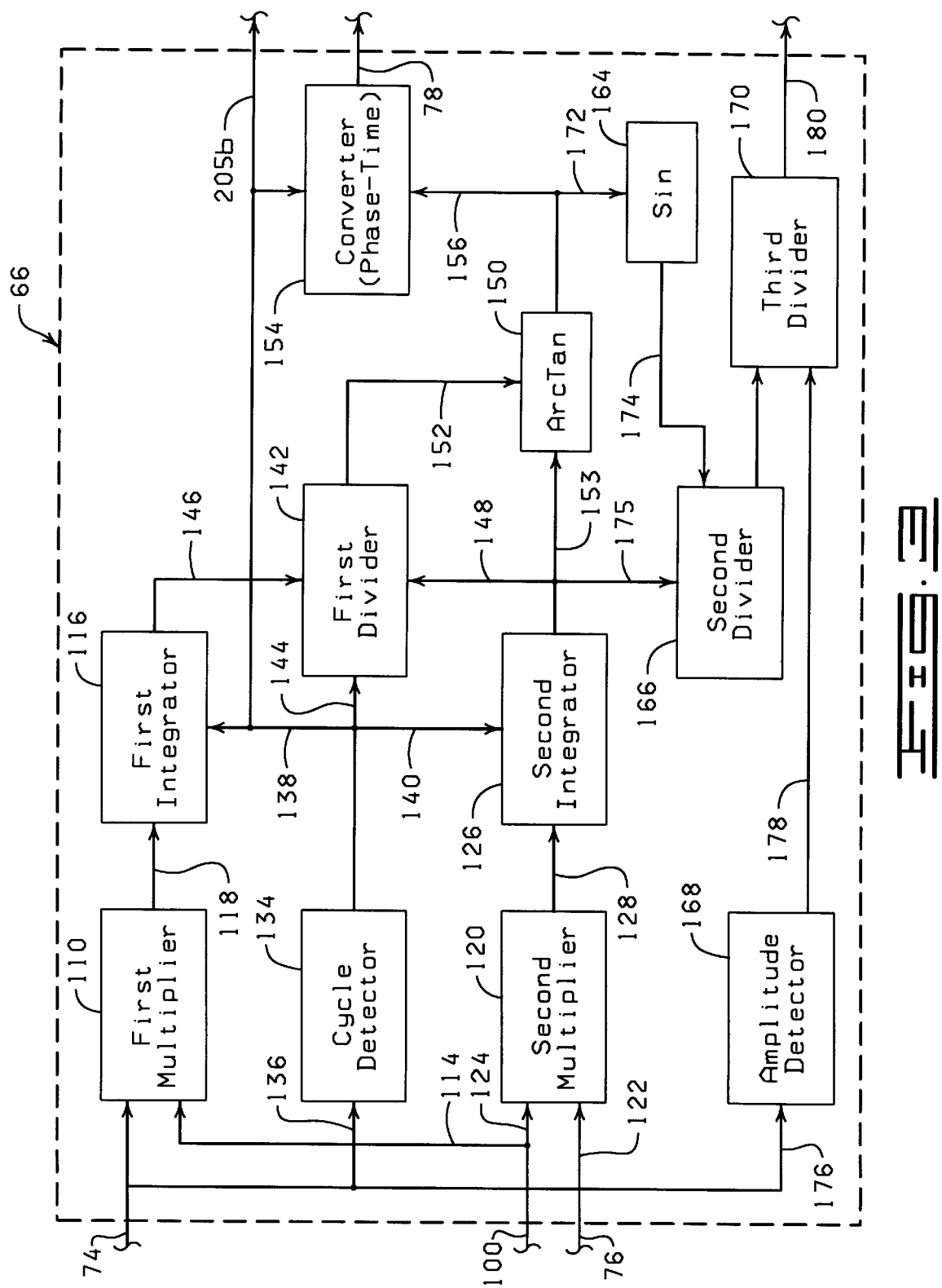
FIG. 3 is a schematic, diagrammatic view of a typical phase/amplitude detector utilized in the fundamental control block depicted in FIG. 2.

Referring now to FIG. 3, the phase/amplitude detector 66 is shown in more detail. The phase/amplitude detector 66 includes a first multiplier 110. The first multiplier 110 receives as input the first pilot reference signal via the signal path 74, and the vibrator output signal via a signal path 114.

When the first pilot reference signal and the vibrator output signal are multiplied, the result is:

$$[A_1 \sin \omega_1 \tau]\left[B_1 \sin(\omega_1 \tau + \beta_1) + \sum_{n=2}^{\infty} B_n \sin(n\omega_1 \tau + \beta n)\right]$$

Using trigonometric identities, the product of the first multiplier 110 may be written as: $[A_1 B_1/2][\cos(2\omega_1 \tau + \beta_1)] + [A_1 B_1$ $$[A_1 B_1/2][\cos(2\omega_1 \tau + \beta_1)] + [A_1 B_1/2][\cos \beta_1] +$$
$$A_1 \sin \omega_1 \left[\sum_{n=2}^{\infty} B_n \sin(n\omega_1 \tau + \beta_n)\right]$$

The product of the first multiplier 110 is output to a first integrator 116 over a signal path 118 where the product is integrated over 1 cycle of the fundamental frequency. Integrating the product of the first multiplier 110 over one cycle of the fundamental frequency results in the following equation:

$$[A_1 B_1/2][\cos \beta_1]$$

The integral of the product of the first pilot reference signal and the vibrator output signal is proportional to the cosine of the phase angle between them. Harmonic distortion does not contribute to this result. Unfortunately, this result is also proportional to reference amplitude $A_1$ and vibrator output fundamental amplitude $B_1$. Reference amplitude $A_1$ is easily measured and can be divided out of the output of the first integrator 116, but vibrator output fundamental amplitude $B_1$ is not available. This is because only the composite vibrator output signal, containing the fundamental and all harmonics is available.

To solve this problem, the second pilot reference signal ($A_1$ cosine $\omega_1 \tau$) and the vibrator output signal ($B_1 \sin(\omega_1 \tau + \beta_1) + B_n \sin(n\omega_1 \tau + \beta_n)$) are provided to a second multiplier 120 via the signal paths 122 and 124, respectively to provide the product of the second pilot reference signal and the vibrator output signal at the output of the second multiplier 120. The output of the second multiplier 120 is represented by the following equation:

$$[A_1 \cos \omega_1 \tau]\left[B_1 \sin(\omega_1 \tau + \beta_1) + \sum_{n=2}^{\infty} B_n \sin(n\omega_1 \tau + \beta n)\right]$$

Using trigonometric identities, the output of the second multiplier 120 may be written as: $[A_1 B_1/2][\sin(2\omega_1 \tau + \beta_1)] + [A_1 B_1/2]$ $$[A_1 B_1/2][\sin(2\omega_1 \tau + \beta_1)] + [A_1 B_1/2][\sin \beta_1] + [A_1 \sin \omega_1 \tau]\left[\sum_{n=2}^{\infty} B_n \sin(n\omega_1 \tau + \beta_n)\right]$$

The output of the second multiplier 120 is provided to the input of a second integrator 126 via a signal path 128 where the product of the second multiplier 120 is integrated over one cycle of the fundamental frequency.

It should be noted that the phase/amplitude detector 66 is provided with a cycle detector 134. The input of the cycle detector 134 receives the first pilot reference signal via a signal path 136. The cycle detector 134 generates an output signal at the end of each full cycle of the first pilot reference signal. The output of the cycle detector 134 is coupled to the first integrator 116, and the second integrator 126 via signal paths 138 and 140, respectively, to cause the first and second integrators 116 and 126 to reset to zero at the end of each cycle of integration. The output of the cycle detector 134 is also provided to a first divider 142 via a signal path 144.

When the output of the second multiplier 120 is integrated over an integral number of cycles, the only non-zero term is:

$$[A_1B_1/2]\sin\beta_1$$

The first integrator 116, and the second integrator 126 have outputs coupled to two inputs of the first divider 142 via respective signal paths 146 and 148. As previously discussed, the first divider 142 also receives the output of the cycle detector 134. The output of the first divider 142 is the quotient of the two input signals received from the first integrator 116 and the second integrator 126 at the time the last signal was received from the cycle detector 134. Thus, the output of the first divider 142 is:

$$[(A_1B_1/2)\sin\beta_1]/[(A_1B_1/2)\cos\beta_1]$$

The amplitude terms $A_1$ and $B_1$ cancel out and result in tangent $\beta_1$. The output of the first divider 142 and the output of the second integrator 126 are supplied to an arc tangent block 150 via signal paths 152 and 153 so as to determine the arc tangent of the output of the first divider 142 to yield the desired angle $\beta_1$. The desired angle $\beta_1$ is supplied from the arc tangent block 150 to a phase/time converter 154 via a signal path 156 where the desired angle $\beta_1$ is converted from phase format to time format.

The output of the phase/time converter 154 is represented in FIG. 2 as the symbol $\Delta\tau_F$. The $\Delta\tau_F$ signal is a DC signal having an amplitude indicative of the time shift necessary to shift the phase of the first pilot reference signal in the proper direction to reduce the phase difference between the fundamental reference signal and the actual motion of the base plate 24.

To determine the amplitude of the fundamental portion of the vibrator output signal $B_1$, the phase/amplitude detector 66 is provided with a sin block 164, a second divider 166, an amplitude detector 168 and a third divider 170. The phase difference between the first pilot reference signal and the fundamental portion of the vibrator output signal $(\beta_1)$ is input to the sin block 164 via a signal path 172. The sin block 164 outputs a signal indicative of sin $\beta_1$ via a signal path 174 to be received by one input of the second divider 166. The second divider 166 also receives as input the output of the second integrator 126 via a signal path 175. The output of the second integrator 126 can be represented by the formula:

$$[A_1B_1/2]\sin\beta_1$$

Thus, the second divider 166 outputs a signal to the third divider 170 which can be represented by the formula $A_1*B_1$.

The amplitude detector 168 receives the first pilot reference signal via a signal path 176 and serves to determine the amplitude of the first pilot reference signal. The amplitude detector 168 outputs the amplitude of the first pilot reference signal $A_1$ to the third divider 170 via a signal path 178. Upon receiving the signals generated by the second divider 166 and the amplitude detector 168, the third divider 170 outputs a signal via a signal path 180 representing the amplitude $B_1$ of the fundamental portion of the vibrator output signal.

Referring now back to FIG. 2, the phase/amplitude detector 66 then outputs a signal via the signal path 78 to the phase corrector 46. Upon receipt of the fundamental frequency time shift error signal, the phase corrector 46 phase shifts the first pilot reference signal received thereby via the signal path 72 by an amount indicated by the fundamental frequency time shift error signal so that the phase shifted pilot signal is adjusted for the delay in the vibrator output at the end of each cycle of the first reference pilot signal. For example, if the fundamental frequency time shift error signal represents a time lag in the vibrator system of 10 ms, the phase corrector 46 adjusts the phase shifted pilot signal to lead the first pilot reference signal by 10 ms so that the vibrator output signal will be in phase with the first pilot reference.

The phase corrector 46 outputs the phase shifted pilot signal to the variable gain amplifier 48 via the signal path 80. The phase/amplitude detector 66 outputs a signal over a signal path 102 to the amplitude control 50 after each cycle of the fundamental frequency in the first pilot reference signal. Upon receipt of the signals from the phase/amplitude detector 66, the amplitude control 50 generates an amplitude control signal which is level adjusted to establish a desired force output. The amplitude control signal is output by the amplitude control 50 via the signal path 82 to the variable gain amplifier 48. The variable gain amplifier 48 receives the phase shifted pilot signal via the signal path 80 and the amplitude control signal via the signal path 82 and then adjusts the magnitude of the phase shifted pilot signal based on the amplitude control signal to produce the amplitude adjusted phase shifted fundamental drive signal. The variable gain amplifier 48 then outputs the amplitude adjusted phase shifted fundamental drive signal to the summing amplifier 16 of the vibrator system 12 via the digital-to-analog converter 52 and the first filter 54, as previously discussed.

The control block 70 communicates with the valve feedback detector 26 and the mass feedback detector 28 via a signal path 104 to determine the position of the valve spool and the reaction mass relative to the base plate 24 and to provide limits on the movement range of such valve spool and reaction mass to prevent damage thereto. The fundamental control block 40 of the control system 10 is conventional in construction and commonly used in the art.

Although only one cycle of the fundamental control block 40 has been described herein, it should be understood that the fundamental control block 40 functions to continuously receive feedback signals from the first and second accelerometers 34 and 36 of the vibrator system 12 and to continuously adjust the fundamental drive signal after each cycle of the first pilot reference signal, as hereinbefore described.

Although the control system 10 has been shown and described as controlling the conventional servo-hydraulic vibrator system 12, it should be understood that the control system 10 is also capable of controlling a marine vibrator system (not shown). The marine vibrator system typically includes a marine transducer capable of generating and applying a reciprocating force to an object, such as water. The marine transducer may include a piston capable of selectively moving water in and out of a cylinder in a well known manner.

In addition, although the summing amplifier 16 has been shown and described as being associated with the vibrator system 12, it should be understood that the summing amplifier 16 can also be associated with and provided as a component of the control system 10.

Referring now again to FIG. 1, the control system 10 is provided with a harmonic distortion reduction system 200 which is constructed in accordance with the present invention. The harmonic distortion reduction system 200 is provided with a plurality of harmonic reduction control blocks 202. Only two harmonic reduction control blocks are shown in FIG. 1 and designated therein by the reference numerals 202a and 202b for purposes of clarity. Each harmonic reduction control block 202 is adapted to output a signal to the summing amplifier 16 of the vibrator system 12 of a proper phase, amplitude and polarity to greatly reduce one distinct or different harmonic frequency generated by the vibrator system 12 and provided in the vibrator output signal such that the amplitude of the harmonic frequency is reduced below a predefined point, such as −50 db, below the amplitude of the fundamental frequency. That is, the harmonic frequencies are reduced as low as possible while leaving enough amplitude for the harmonic reduction control blocks 202 to phase lock onto. The amount of reduction of the amplitude of the harmonic frequencies will depend on the amplitude of the fundamental pilot signal, and the individual harmonic frequencies as well as the dynamic range of the phase-lock loop provided in the harmonic reduction control blocks 202. It is necessary to implement one harmonic reduction control block 202 for each harmonic frequency a user wishes to eliminate. Certain field conditions may require several harmonic reduction control blocks 202 to attenuate all the harmonic frequencies present on the vibrator output signal.

As shown in FIG. 1, each harmonic reduction control block 202a and 202b receives the fundamental frequency time shift error signal via respective signal paths 204a and 204b, the output signal indicating the end of each full cycle of the first pilot reference signal via signal paths 205a and 205b, and the vibrator output signal via respective signal paths 206a and 206b. Each harmonic reduction control block 202a and 202b utilizes the fundamental frequency time shift error signal and the vibrator output signal to generate a signal and output such signal to the summing amplifier 16 of the vibrator system 12 as indicated via respective signal paths 207a and 207b.

The harmonic reduction control block 202a corresponding to the reduction of the second harmonic frequency of the fundamental frequency will now be described. However, like parts on the harmonic reduction control blocks 202a and 202b will be indicated in the drawings with the same numeral, but different alphabetic suffixes "a" and "b", respectively. It should be understood that each of the harmonic reduction control blocks 202 of the harmonic distortion reduction system 200 function identically except that each of the harmonic reduction control blocks 202 is tuned to a different harmonic frequency of the fundamental frequency being generated by the function generator 44 of the fundamental control block 40.

The harmonic reduction control block 202a is provided with a function generator 210a which outputs a first harmonic reference signal on signal paths 212a and 214a, and a second harmonic reference signal on a signal path 216a. The first harmonic reference signal and the second harmonic reference signal can be designated as $A_2 \sin(\omega_2 \tau)$ and $A_2 \cos(\omega_2 \tau)$ where $\omega_2 = 2*\omega_1$ and $A_2$=the amplitude of the first and second harmonic reference signals. The first harmonic reference signal and the second harmonic reference signal are 90 degrees out of phase. The first harmonic reference signal and the second harmonic reference signal have a same frequency which is twice the frequency of the first pilot reference signal and the second pilot reference signal generated by the function generator 44 of the fundamental control block 40. The first harmonic reference signal and the second harmonic reference signal have the same initial phase as the first pilot reference signal and the second pilot reference signal, respectively. The first harmonic reference signal and the second harmonic reference signal are input to a phase/amplitude detector 218a via the respective signal paths 214a and 216a. The phase/amplitude detector 218a of the harmonic reduction control block 202a receives the vibrator output signal from the fundamental control block 40 via the signal path 206a. The phase/amplitude detector 218a functions to detect the instantaneous phase errors between the first harmonic reference signal, the second harmonic reference signal, and the vibrator output signal. The phase/amplitude detector 218a is substantially identical in construction and function as the phase/amplitude detector 66 hereinbefore described with reference to FIG. 2A, except that the phase/amplitude detector 218a receives an output signal indicating the end of each full cycle of the first pilot reference signal. The output signal is produced by the cycle detector 134 of the phase/amplitude detector 66 (as shown in FIG. 3) and transmitted to the phase/amplitude detector 218a via the signal path 205a. Although in the preferred embodiment, only one cycle detector is used to produce the output signal indicating the end of each full cycle of the first pilot reference signal, it should be understood that each phase/amplitude detector, such as the phase/amplitude detectors 66, 218a and 218b could each be provided with a same or a separate cycle detector.

The phase/amplitude detector 218a outputs a second harmonic frequency time shift error signal which is indicative of the time shift required to make the second harmonic frequency of the fundamental frequency, as seen at the vibrator output signal, in phase with the first harmonic reference signal. The second harmonic frequency time shift error signal is indicated by the symbol $\Delta t_{2F}$ in FIG. 4 and is output by the phase/amplitude detector 218a via a signal path 220a to be received and input into an adder 222a.

Figure 4:
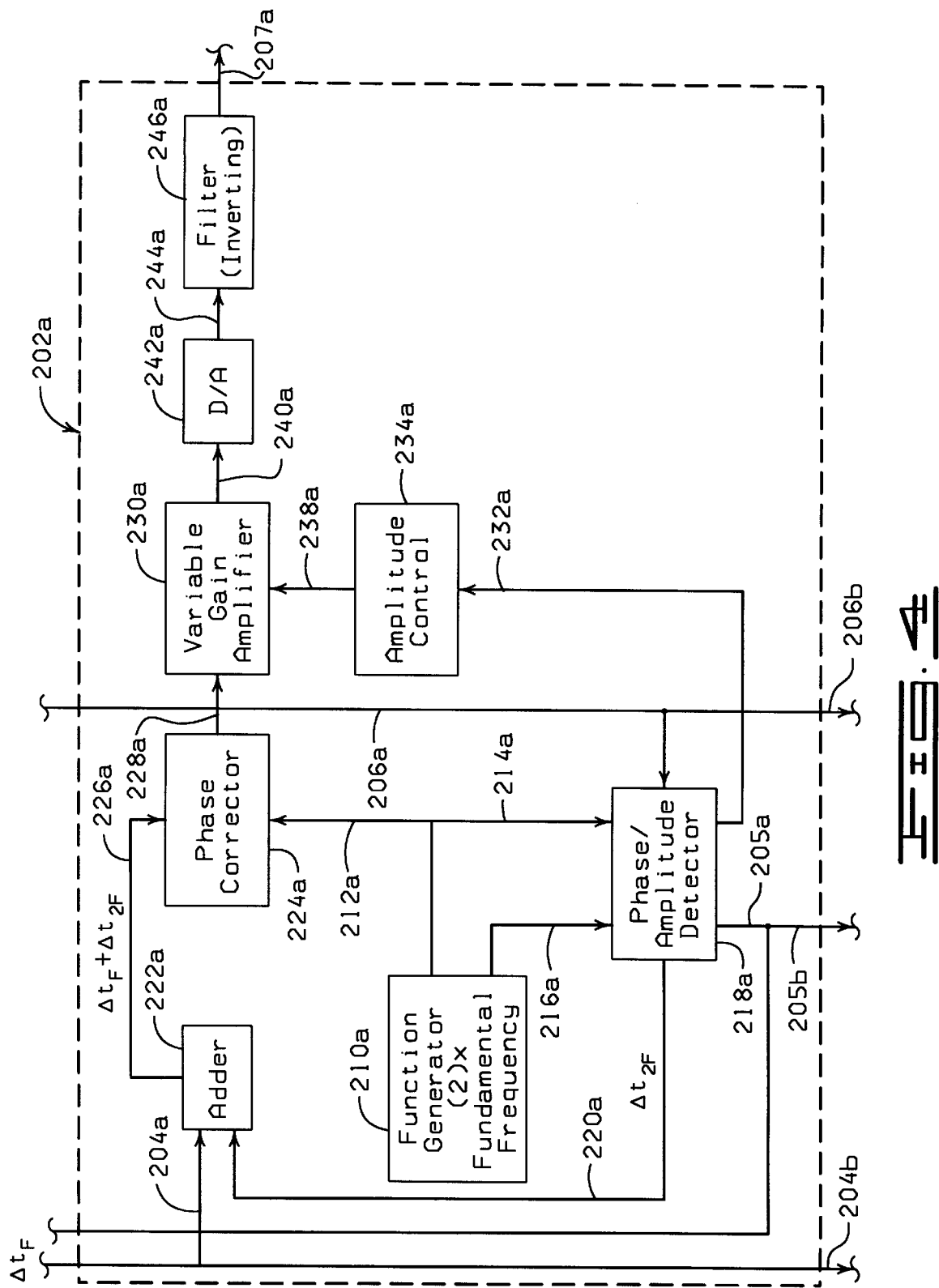
FIG. 4 is a schematic, diagrammatic view of a second harmonic reduction control block constructed in accordance with the present invention.
Figure 5:
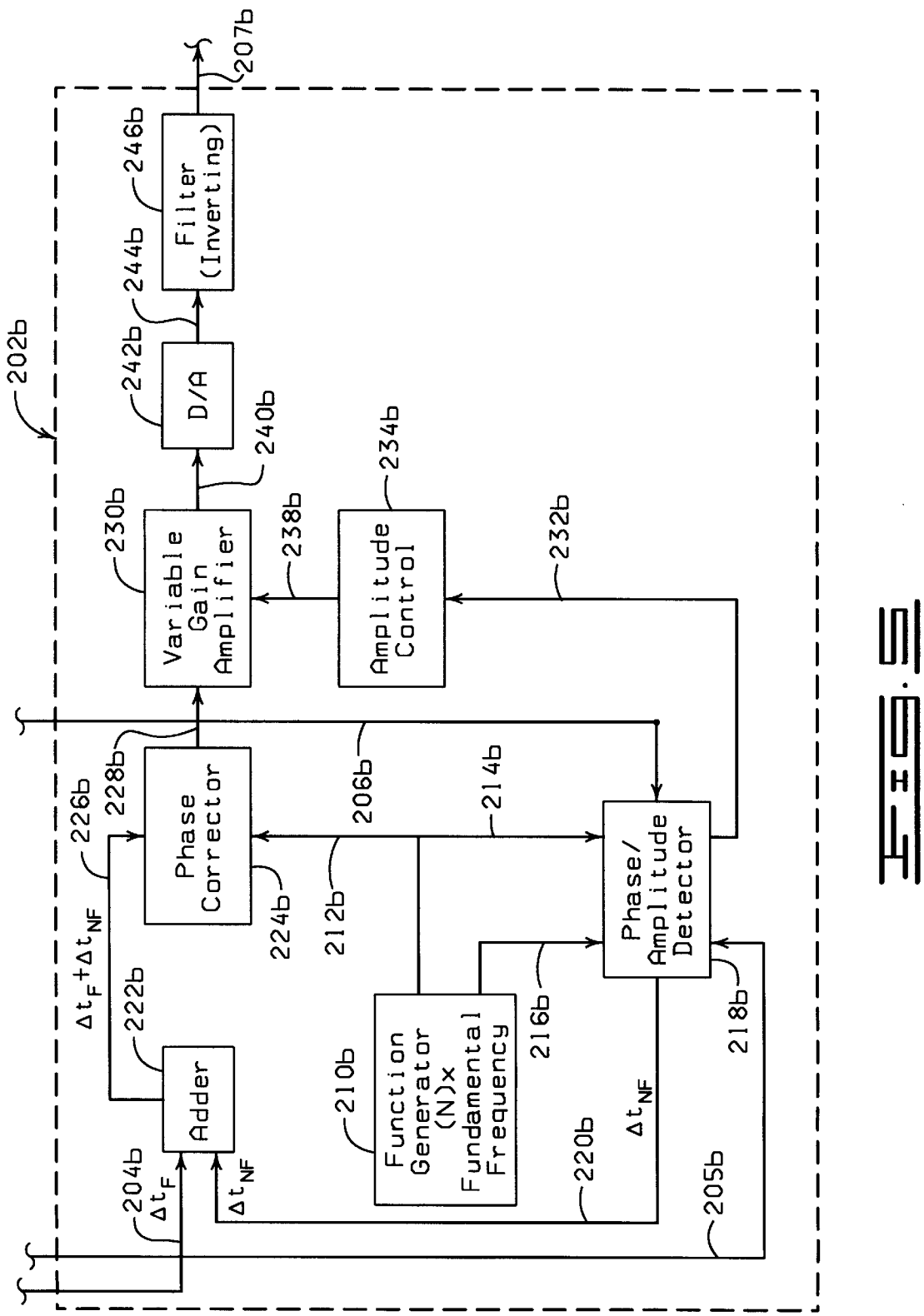
FIG. 5 is a schematic, diagrammatic view of an $N^{th}$ harmonic reduction control block constructed in accordance with the present invention.

The adder 222a also receives the fundamental frequency time shift error signal via the signal path 204a and produces a time shift error output signal which is the instantaneous sum of the fundamental frequency time shift error signal (produced by the fundamental control block 40) and the second harmonic frequency time shift error signal (produced by the second harmonic reduction control block 202a). The time shift error output signal produced by the adder 222a is indicated in FIG. 4 as the formula $\Delta t_F + \Delta t_{2F}$ and is input to a phase corrector 224a via a signal path 226a.

The phase corrector 224a receives the output of the adder 222a and the first harmonic reference signal via signal paths 226a and 212a. The phase corrector 224a changes the phase of the first harmonic reference signal based on the signal received from the adder 222a to produce a phase shifted harmonic pilot signal pursuant to the formula $\sin(\omega_2 \tau + (\Delta t_F + \Delta t_{2F}))$. In other words, the phase of the first harmonic reference signal is phase shifted an amount substantially equal to the sum of the fundamental frequency time shift error signal and the second harmonic frequency time shift error signal. The phase corrector 224a then outputs such signal over a signal path 228a to be received by a variable gain amplifier 230a.

The phase/amplitude detector 218a of the second harmonic reduction control block 202a outputs a signal over a signal path 232a indicative of the instantaneous amplitudes of the second harmonic frequencies present in the vibrator output signal. This signal is received by an amplitude control block 234*a*.

Initially, the amplitude control block 234*a* is programmed with a predetermined amplitude level. The amplitude control block 234*a* receives a signal from the phase/amplitude detector 218*a* after each cycle of the first pilot reference signal and increases the amplitude of the signal sent to the variable gain amplifier 230*a* until the amplitude of the particular harmonic frequency as indicated by the phase/amplitude detector 218*a* has been reduced below a certain predefined point. Thus, the amplitude control block 234*a* functions to adjust the amplitude of the signal output by the second harmonic reduction control block 202*a* in real-time as the first pilot reference signal is swept across its predetermined range. The amplitude control block 234*a* outputs the signal via a signal path 238*a* to the variable gain amplifier 230*a*.

The variable gain amplifier 230*a* receives the signal from the phase corrector 224*a* and the signal from the amplitude control block 234*a*, and in response thereto outputs a signal having the same phase as the phase shifted harmonic pilot signal output by the phase corrector 224*a* and an amplitude about equal to the level necessary to remove the second harmonic frequency seen on the vibrator output signal. This amplitude adjusted and phase shifted harmonic pilot signal is output from the variable gain amplifier 230*a* over a signal path 240*a* to a digital-to-analog converter 242*a*. The digital-to-analog converter 242*a* converts the digital signal produced by the variable gain amplifier 230*a* into an analog signal. The analog signal is then output via a signal path 244*a* to an inverting filter 246*a*. The inverting filter 246*a* inverts the polarity of the analog signal produced by the digital-to-analog converter 242*a* and outputs such inverted signal to the summing amplifier 16 of the vibrator system 12 via the signal path 207*a*. It should be noted that the signal output by the inverting filter 246*a* of the second harmonic reduction control block 202*a* has a proper phase, polarity, and amplitude to minimize or greatly reduce the second harmonic distortion previously seen at the output of the vibrator system 12.

The operation of the other harmonic reduction control blocks 202, such as the harmonic reduction control block 202*b* will not be described for purposes of clarity. However, it should be understood that the other harmonic reduction control blocks 202 function identically as the second harmonic reduction control block 202*a* (hereinbefore described with reference to FIG. 4), except that the function generators 210 of such other harmonic reduction control blocks 202 are each tuned to a different and distinct harmonic frequency of the fundamental frequency.

It should be understood that all of the signal paths and components, blocks or systems of the control system 10 have been shown and described separately herein for the sole purpose of clearly identifying the information being communicated between each of the individual components of the control system 10 and the operation of each of the components. In operation, the signal paths and components, blocks or systems of the control system 10 may be separate or combined so long as the logic of the control system 10 is executed substantially as described herein.

It should also be understood that the control system 10 can be embodied as: a software program executing on a suitable computer; a plurality of discrete or integrated electrical components; and/or combinations thereof.

Changes may be made in the construction and the operation of the various components, elements and assemblies described herein and changes may be made in the steps or the sequence of steps of the methods described herein without departing from the spirit and scope of the invention as defined in the following claims.

What is claimed is:

1. A control system for a vibrator system capable of generating and applying a reciprocating force to an object, the control system comprising:

means for outputting a drive signal having a fundamental frequency and a phase to the vibrator system to activate the reciprocating force generatable by the vibrator system, the vibrator system creating a vibrator output signal indicative of the force and phase applied to the object; and a harmonic distortion reduction assembly, comprising:
   means for receiving the vibrator output signal produced by the reciprocating force generatable by the vibrator system, the vibrator output signal including at least one harmonic frequency signal having an amplitude, a phase and a frequency, the frequency of the harmonic frequency signal being a harmonic of the fundamental frequency in the drive signal; and means for outputting at least one harmonic drive signal continuously and immediately based on the vibrator output signal wherein the harmonic drive signal has a phase, amplitude, polarity, and frequency adjusted to minimize the amplitude of the harmonic frequency signal in a subsequent cycle of the vibrator output signal.

2. The control system as defined in claim 1, wherein the vibrator output signal includes a plurality of harmonic frequency signals with each harmonic frequency signal having a different harmonic frequency of the fundamental frequency, and wherein the harmonic distortion reduction means includes a plurality of harmonic reduction control blocks receiving the vibrator output signal with each harmonic reduction control block being adapted to output a signal to the vibrator system of a proper phase, amplitude, and polarity to minimize the amplitude of one of the harmonic frequency signals in the vibrator output signal.

3. The control system as defined in claim 1, further comprising means for determining a fundamental frequency time shift error signal representing a phase shift to adjust the phase of a first reference pilot signal for the delay in the vibrator output signal, and wherein the harmonic distortion reduction assembly includes:

function generator means for generating a first harmonic reference signal and a second harmonic reference signal, the first and second harmonic reference signals having a same frequency which is at least a second harmonic of the fundamental frequency, the first harmonic reference signal and the second harmonic reference signal being 90 degrees out of phase;

phase detector means receiving the first and second harmonic reference signals and the vibrator output signal for determining a harmonic frequency time shift error signal indicative of the phase errors between the first harmonic reference signal and the vibrator output signal;

phase corrector means receiving the first harmonic reference signal for phase shifting in the time domain the first harmonic reference signal an amount substantially equal to the sum of the harmonic frequency time shift error signal and the fundamental frequency time shift error signal to provide a phase shifted harmonic pilot signal;

amplitude control means receiving the vibrator output signal for outputting an amplitude control signal indicative of the instantaneous amplitudes of the vibrator output signal; and amplifier means receiving the phase shifted harmonic pilot signal and the amplitude control signal for adjusting the amplitude and polarity of the phase shifted harmonic signal to provide the harmonic drive signal.

4. A system as defined in claim 1, further comprising:

means for receiving and summing the drive signal and the harmonic drive signal to provide a summed signal to the vibrator system.

5. A method for controlling a vibrator system capable of generating and applying a reciprocating force to an object, the method comprising the steps of:

outputting a drive signal having a fundamental frequency and a phase to the vibrator system to activate the reciprocating force generatable by the vibrator system, the vibrator system creating a vibrator output signal indicative of the force and phase applied to the object;

receiving the vibrator output signal produced by the reciprocating force generatable by the vibrator system, the vibrator output signal including at least one harmonic frequency signal having an amplitude and a frequency, the frequency of the harmonic frequency signal being a harmonic of the fundamental frequency in the drive signal; and outputting at least one harmonic drive signal to the vibrator system continuously and immediately based on the vibrator output signal wherein the harmonic drive signal has a phase, amplitude, polarity, and frequency adjusted to minimize the amplitude of the harmonic frequency signal in a subsequent cycle of the vibrator output signal.

6. The method as defined in claim 5, further comprising the steps of:

determining a fundamental frequency time shift error signal representing a phase shift to adjust the phase of a first reference pilot signal for the delay in the vibrator output signal;

outputting a first harmonic reference signal and a second harmonic reference signal, the first and second harmonic reference signals having a same frequency which is at least a second harmonic of the fundamental frequency, the first harmonic reference signal and the second harmonic reference signals being 90 degrees out of phase;

receiving the first and second harmonic reference signals and the vibrator output signal by a phase detector;

determining, by the phase corrector, a harmonic frequency time shift error signal indicative of the phase errors between the first harmonic reference signal and the vibrator output signal;

outputting the harmonic frequency time shift error signal;

receiving, by a phase corrector, the first harmonic reference signal, the harmonic frequency time shift error signal and the fundamental frequency time shift error signal;

shifting, by the phase corrector, the phase of the first harmonic reference signal in the time domain an amount substantially equal to the sum of the harmonic frequency time shift error signal and the fundamental frequency time shift error signal to provide a phase shifted harmonic pilot signal;

outputting the phase shifted harmonic pilot signal;

receiving, by an amplitude control, the vibrator output signal;

outputting, by the amplitude control, an amplitude control signal indicative of the instantaneous amplitudes of the vibrator output signal;

receiving, by an amplifier, the phase shifted harmonic pilot signal and the amplitude control signal;

adjusting the amplitude of the phase shifted harmonic pilot signal by an amount determined by the amplitude control signal to provide a signal; and inverting the polarity of the signal provided by the amplifier to provide the harmonic drive signal.

7. A control system for a vibrator system capable of generating and applying a reciprocating force to an object, the control system comprising:

means for outputting a drive signal having a fundamental frequency and a phase to the vibrator system to activate the reciprocating force generatable by the vibrator system and to thereby create a vibrator output signal indicative of the force and phase applicable to the object;

means for determining a fundamental frequency time shift error signal representing a phase shift to adjust the phase of a first reference pilot signal for the delay in the vibrator output signal; and a harmonic distortion reduction assembly, comprising:

means for receiving the vibrator output signal produced by the reciprocating force generatable by the vibrator system, the vibrator output signal including at least one harmonic frequency signal having an amplitude, a phase and a frequency, the frequency of the harmonic frequency signal being a harmonic of the fundamental frequency in the drive signal;

function generator means for generating a first harmonic reference signal and a second harmonic reference signal, the first and second harmonic reference signals having a same frequency which is at least a second harmonic of the fundamental frequency, the first harmonic reference signal and the second harmonic reference signal being 90 degrees out of phase;

phase detector means receiving the first and second harmonic reference signals and the vibrator output signal for determining a harmonic frequency time shift error signal indicative of the phase errors between the first harmonic reference signal and the vibrator output signal;

phase corrector means receiving the first harmonic reference signal for phase shifting the first harmonic reference signal an amount substantially equal to the sum of the harmonic frequency time shift error signal and the fundamental frequency time shift error signal to provide a phase shifted harmonic pilot signal;

amplitude control means receiving the vibrator output signal for outputting an amplitude control signal indicative of the instantaneous amplitudes of the vibrator output signal;

amplifier means receiving the phase shifted harmonic pilot signal and the amplitude control signal for adjusting the amplitude and polarity of the phase shifted harmonic signal to provide a harmonic drive signal wherein the harmonic drive signal has a phase, amplitude, polarity, and frequency adjusted to minimize the amplitude of the harmonic frequency signal in the vibrator output signal; and means for outputting the harmonic drive signal.

8. A method for controlling a vibrator system capable of generating and applying a reciprocating force to an object, the method comprising the steps of:

outputting a drive signal having a fundamental frequency and a phase to the vibrator system to activate the reciprocating force generatable by the vibrator system and to thereby create a vibrator output signal indicative of the force and phase applied to the object;

receiving the vibrator output signal produced by the reciprocating force generatable by the vibrator system, the vibrator output signal including at least one harmonic frequency signal having an amplitude, a phase and a frequency, the frequency of the harmonic frequency signal being a harmonic of the fundamental frequency in the drive signal; and determining a fundamental frequency time shift error signal representing a phase shift to adjust the phase of a first reference pilot signal for the delay in the vibrator output signal;

outputting a first harmonic reference signal and a second harmonic reference signal, the first and second harmonic reference signals having a same frequency which is at least a second harmonic of the fundamental frequency, the first harmonic reference signal and the second harmonic reference signals being 90 degrees out of phase;

receiving the first and second harmonic reference signals and the vibrator output signal by a phase detector;

determining, by the phase detector, a harmonic frequency time shift error signal indicative of the phase errors between the first harmonic reference signal and the vibrator output signal;

outputting the harmonic frequency time shift error signal;

receiving, by a phase corrector, the first harmonic reference signal, the harmonic frequency time shift error signal and the fundamental frequency time shift error signal;

shifting, by the phase corrector, the phase of the first harmonic reference signal an amount substantially equal to the sum of the harmonic frequency time shift error signal and the fundamental frequency time shift error signal to provide a phase shifted harmonic pilot signal;

outputting the phase shifted harmonic pilot signal;

receiving, by an amplitude control, the vibrator output signal;

outputting, by the amplitude control, an amplitude control signal indicative of the instantaneous amplitudes of the vibrator output signal;

receiving, by an amplifier, the phase shifted harmonic pilot signal and the amplitude control signal;

adjusting the amplitude of the phase shifted harmonic pilot signal by an amount determined by the amplitude control signal to provide a signal; and inverting the polarity of the signal provided by the amplifier to provide a harmonic drive signal having a phase, amplitude, polarity, and frequency adjusted to minimize the amplitude of the harmonic frequency signal in a subsequent cycle of the vibrator output signal;

outputting the harmonic drive signal to the vibrator system.

* * * * *

UNITED STATES PATENT AND TRADEMARK OFFICE
CERTIFICATE OF CORRECTION

PATENT NO. : 6,035,257
DATED : March 7, 2000
INVENTOR(S) : Leonard D. Epperson

It is certified that error appears in the above-identified patent and that said Letters Patent is hereby corrected as shown below:

In the Drawings:
Fig. 2, delete the numeral "205b" and substitute --205a-- therefor.

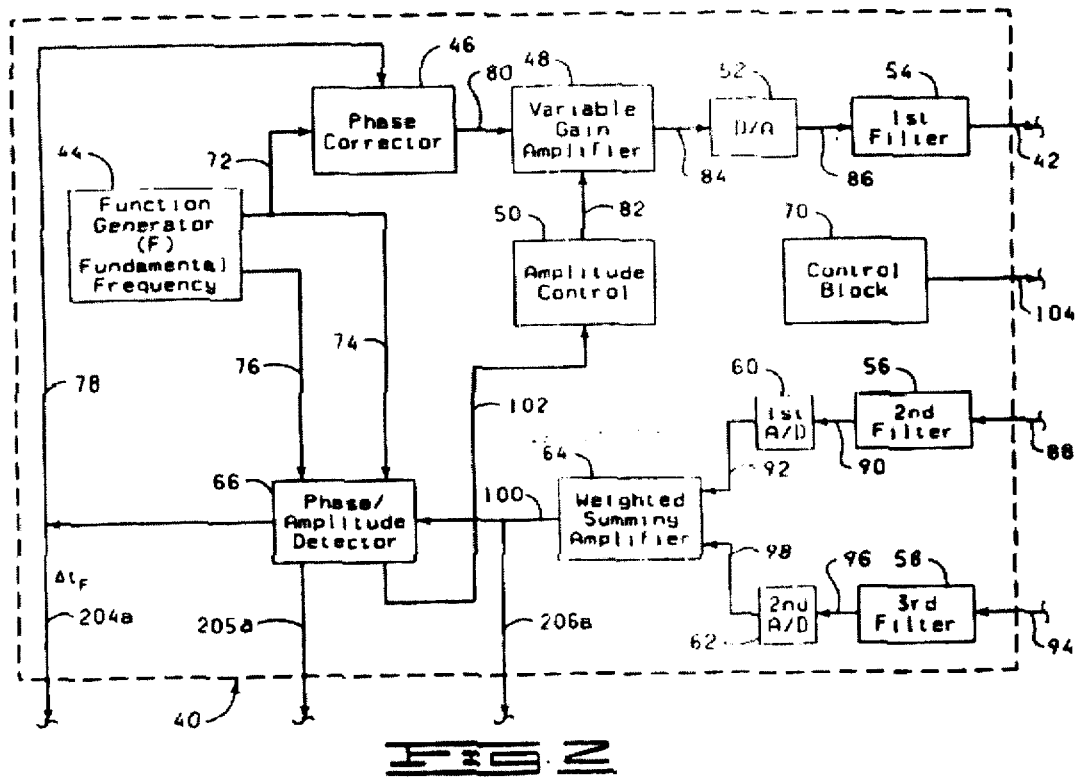

UNITED STATES PATENT AND TRADEMARK OFFICE
CERTIFICATE OF CORRECTION

PATENT NO. : 6,035,257
DATED : March 7, 2000
INVENTOR(S) : Leonard D. Epperson

It is certified that error appears in the above-identified patent and that said Letters Patent is hereby corrected as shown below:

In the Description

COLUMN 6:
Lines 10-11, delete "$[A_1B_1/2] [\cos(2\omega_1\tau+\beta_1)]+[A_1B_1$";
Lines 57-58, delete "$[A_1B_1/2] [\sin(2\omega_1\tau+\beta_1)]+[A_1B_1/2]$";

COLUMN 10:
Line 20, delete "FIG. 2A," and substitute --FIG. 2,-- therefor.

Signed and Sealed this

Twelfth Day of June, 2001

*Attest:*

*Attesting Officer*

NICHOLAS P. GODICI
*Acting Director of the United States Patent and Trademark Office*